(12) United States Patent
Schamuhn et al.

(10) Patent No.: US 9,638,876 B2
(45) Date of Patent: May 2, 2017

(54) OPTO-ELECTRICAL TRANSCEIVER MODULE AND ACTIVE OPTICAL CABLE

(71) Applicants: Kai Schamuhn, Berlin (DE); Andreas Krink, Berlin (DE); Johannes Daumenlang, Berlin (DE); John Spickler, Columbia, PA (US)

(72) Inventors: Kai Schamuhn, Berlin (DE); Andreas Krink, Berlin (DE); Johannes Daumenlang, Berlin (DE); John Spickler, Columbia, PA (US)

(73) Assignees: FCI Americas Technology LLC, Carson City, NV (US); FCI Asia Pte. Ltd., Singapore (SG)

( * ) Notice: Subject to any disclaimer, the term of this patent is extended or adjusted under 35 U.S.C. 154(b) by 0 days.

(21) Appl. No.: 14/338,209

(22) Filed: Jul. 22, 2014

(65) Prior Publication Data

US 2015/0316732 A1    Nov. 5, 2015

Related U.S. Application Data

(60) Provisional application No. 61/861,849, filed on Aug. 2, 2013.

(51) Int. Cl.
*G02B 6/43* (2006.01)
*H04B 10/40* (2013.01)
(Continued)

(52) U.S. Cl.
CPC .......... *G02B 6/428* (2013.01); *G02B 6/4246* (2013.01); *G02B 6/4284* (2013.01); *G02B 6/43* (2013.01);
(Continued)

(58) Field of Classification Search
USPC .......................................... 398/139
See application file for complete search history.

(56) References Cited

U.S. PATENT DOCUMENTS

| | | | |
|---|---|---|---|
| 2002/0076173 A1 | 6/2002 | Jiang et al. | |
| 2003/0020986 A1* | 1/2003 | Pang | G02B 6/4201 398/139 |

(Continued)

FOREIGN PATENT DOCUMENTS

| | | |
|---|---|---|
| CN | 2552256 Y | 5/2003 |
| CN | 1474951 A | 2/2004 |

(Continued)

OTHER PUBLICATIONS

International Preliminary Report for Patentability for application No. PCT/US2014/047999 mailed Feb. 2, 2016.

(Continued)

*Primary Examiner* — David Payne
*Assistant Examiner* — Omar S Ismail
(74) *Attorney, Agent, or Firm* — Wolf, Greenfield & Sacks, P.C.; Edmund J. Walsh

(57) ABSTRACT

An opto-electrical transceiver module and an active optical cable comprising such a module are disclosed. The module includes a first printed circuit board and a second printed circuit board. The first printed circuit board carries 1) a light sources with driver circuitry that converts incoming electrical signals to optical signals, 2) optical receiver components with amplifier circuitry that converts optical signals to electrical signals, 3) a single optical coupling unit configured to optically coupling waveguides of an optical cable to the light sources as well as to the optical receiver components, and (4) one or more electrical contacts configured to connect to a host device. The second printed circuit board (Continued)

includes electrical contacts connected to the driver circuitry or to the amplifier circuitry on the first printed circuit board.

26 Claims, 4 Drawing Sheets

(51) Int. Cl.
    *G02B 6/42*     (2006.01)
    *G02B 6/44*     (2006.01)

(52) U.S. Cl.
    CPC ........... *G02B 6/4416* (2013.01); *H04B 10/40* (2013.01); *G02B 6/4249* (2013.01); *G02B 6/4281* (2013.01); *G02B 6/4292* (2013.01)

(56) References Cited

U.S. PATENT DOCUMENTS

| | | | |
|---|---|---|---|
| 2003/0103734 A1 | 6/2003 | Brezina et al. | |
| 2004/0069997 A1* | 4/2004 | Dair | G02B 6/4214 257/81 |
| 2004/0086240 A1 | 5/2004 | Togami et al. | |
| 2004/0197056 A1 | 10/2004 | Oki | |
| 2005/0244095 A1 | 11/2005 | Ellison | |
| 2006/0291785 A1* | 12/2006 | Epitaux | H04B 10/40 385/92 |
| 2009/0093137 A1* | 4/2009 | Badehi | G02B 6/4201 439/61 |
| 2009/0290619 A1* | 11/2009 | Flens | G02B 6/43 375/219 |
| 2011/0031379 A1 | 2/2011 | Ishigami et al. | |
| 2011/0123150 A1 | 5/2011 | Zbinden et al. | |
| 2011/0142086 A1* | 6/2011 | Watanabe | H01S 5/02415 372/34 |
| 2011/0228483 A1* | 9/2011 | Togami | G02B 6/4246 361/714 |
| 2012/0057822 A1* | 3/2012 | Wu | G02B 6/136 385/49 |

FOREIGN PATENT DOCUMENTS

| | | |
|---|---|---|
| CN | 2697672 Y | 5/2005 |
| CN | 101713850 A | 5/2010 |
| CN | 202083817 | 12/2011 |
| EP | 0953856 | 11/1999 |

OTHER PUBLICATIONS

International Search Report and Written Opinion for application No. PCT/US2014/047999 mailed Nov. 12, 2014.
Extended European Search Report for European Application No. 14833001.2 dated Nov. 25, 2016.
Chinese Office Action and English translation thereof for Chinese Application No. 201480042853.X dated Nov. 23, 2016.

* cited by examiner

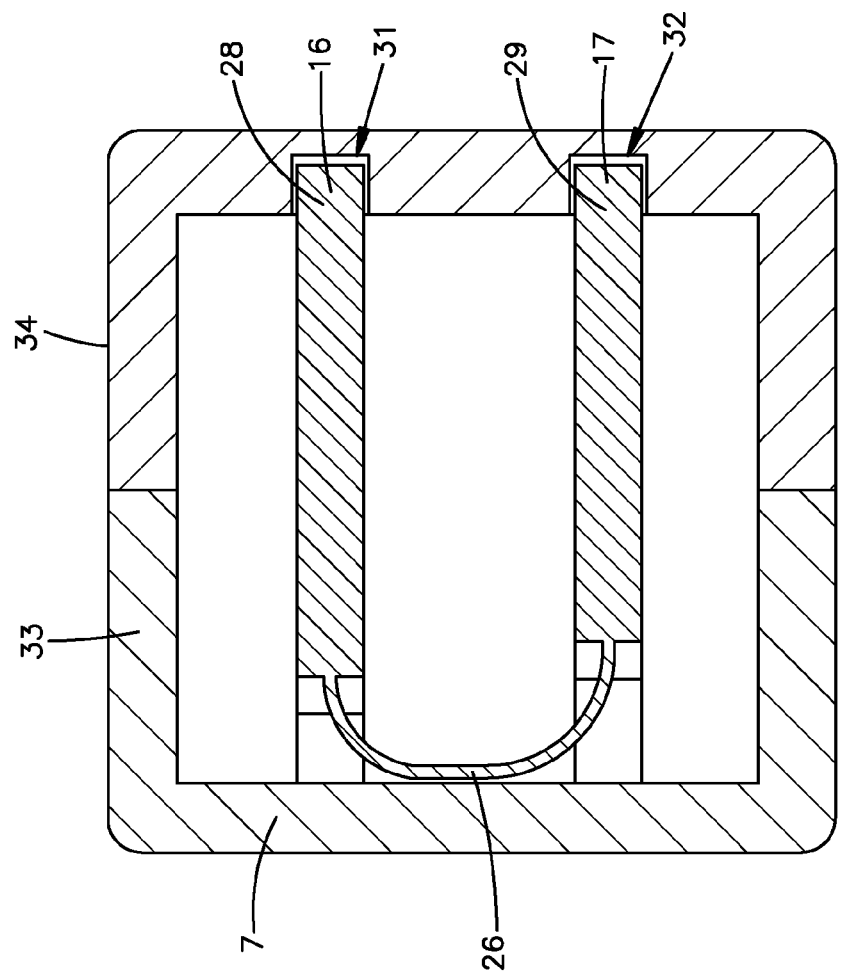

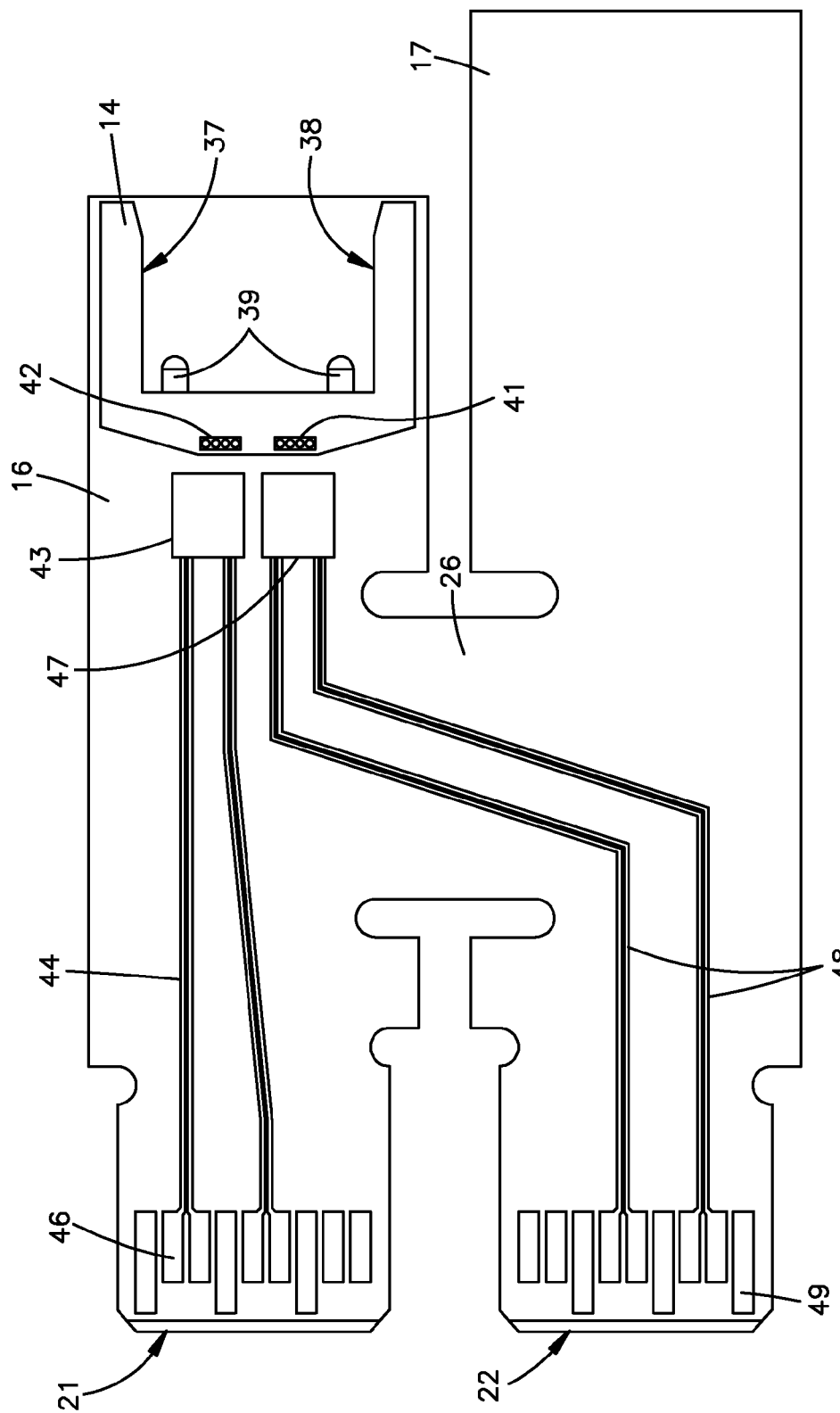

OPTO-ELECTRICAL TRANSCEIVER MODULE AND ACTIVE OPTICAL CABLE

CROSS-SECTION TO RELATED APPLICATIONS

This claims priority to U.S. Provisional Patent Application Ser. No. 61/861,849 filed Aug. 2, 2013, the disclosure of which is hereby incorporated by reference as if set forth in its entirety herein.

BACKGROUND

The present disclosure relates to an opto-electrical transceiver module, in particular to a header or receptacle module for connecting an active optical cable to a host device. The present disclosure also relates to an active optical cable provided with such an opto-electrical transceiver module.

Active optical cables use electrical-to-optical signal conversion on the cable ends to provide high-speed signal transmission, e.g., up to 10 Gbits/s or faster, without sacrificing compatibility with standard electrical interfaces. The terminal ends of active optical cables are provided with opto-electrical modules for converting electrical signals into optical signals and vice versa. Active optical cables can replace conventional copper cables allowing longer cable lengths at higher data transmission rates.

An opto-electrical transceiver module usually includes a transmitter unit for transmitting optical signals and a receiver unit for receiving optical signals.

The transmitter unit is typically provided with electrical driver circuitry, one or more high speed light sources, such as one or more lasers and/or one or more LED's, and an optical coupling unit for guiding optical signals from the light sources to an optical waveguide, in particular optical fiber.

The receiver unit is typically provided with an optical coupling unit for receiving optical signals from optical waveguides, in particular optical fibers, photoelectric elements for converting the optical signals to electrical signals, such as PIN or APD diodes, and amplifier circuitry to amplify signals to a suitable logical output signal level.

Additionally a microcontroller can be used to control and monitor the receiver unit and/or the transmitter unit and/or to provide access to these units via a low speed interface. Such a microcontroller can also be used to store non-volatile settings and/or product related information in its memory accessible via a low speed interface.

These components are usually carried on one or more printed circuit boards (PCB's) with contact pads for contacting matching data transmission contacts of a host device. There are several possible standard configurations. In one of these standard configurations a stack of two PCB's is used: a transmitter PCB with contact pads for receiving electrical signals from the host device and a receiver PCB with contact pads for transferring electrical signals to the host device. In present day transceiver modules the transmitter PCB carries the transmitter chip and associated components including an optical coupler for guiding outgoing optical signals from the light sources to waveguides of an optical cable, while the receiver PCB carries the receiver chip and associated components including an optical coupler for guiding incoming optical signals from optical waveguides of an optical cable.

In use optical signals coming in from optical waveguides of an optical cable are converted by the receiver unit into electrical signals traveling on the PCB to the host device, into which the opto-electrical transceiver module is plugged.

In return, incoming electrical signals from the host device travel via the transmitter PCB to the driver circuitry driving the high speed light sources to convert the electrical signals to optical signals. These optical signals are fed to optical waveguides of an optical cable via the optical coupling unit.

The receiver and transmitter units and PCB's consume considerable space resulting in bulky modules. In line with the general trend of miniaturization there is a need for an opto-electrical module consuming less space. More particularly, many host devices have a communication port configured to communicate with Mini SAS HD standard interface connectors, which creates a need for an optical transceiver module that is compact enough to be designed as a Mini SAS HD module.

SUMMARY

To this end, an opto-electrical transceiver module is disclosed comprising a first PCB and a second PCB. The first PCB carries:
  one or more light sources, such as VCSEL's or LED's, with driver circuitry for converting incoming electrical signals to optical signals,
  one or more optical receiver components, such as PIN diodes or APD diodes, with amplifier circuitry for converting optical signals to electrical signals,
  a single optical coupling unit configured for optically coupling waveguides of an optical cable to the light sources as well as to the optical receiver components and
  one or more contacts for connection to a host device.

Also the second PCB has one or more contacts for connection to a host device. At least a part of the contacts of the second PCB is connected to the driver circuitry or to the amplifier circuitry.

For instance, the driver circuitry and the amplifier circuitry can each be connected to contacts on different respective PCB's. E.g., the driver circuitry can be connected to the contacts of the first PCB, while the amplifier circuitry is connected to the contacts of the second PCB or the amplifier circuitry can be connected to the contacts of the first PCB, while the driver circuitry is connected to the contacts of the second PCB. In such a configuration only a single optical coupling unit is used for incoming as well as for outgoing optical signals. This considerably reduces space consumption and makes it for example possible to configure the transceiver module a standard Mini SAS HD module.

To comply with the Mini SAS HD configuration the first and second PCB's may comprise a contact edge providing the contacts for connection to a host device. The contact edge may have contact pads connected to either driver circuitry on the first PCB associated with the light sources or to amplifier circuitry on the first PCB associated with the optical receiver components.

To bridge the two rigid PCB's a flexible board can be used to connect the contact pads of the second PCB with the driver circuitry or amplifier circuitry. The flexible board can be folded to align the first and second PCB's, both PCB's having parallel contact edges for contacting matching connections of a host device. This arrangement can be used to provide a contact edge for the transmittal path and a separate contact edge for a receiving path.

A particularly compact arrangement is achieved if the optical coupling unit is arranged between the two PCB's. The PCB's may for instance be parallel, the optical coupling unit being sandwiched between the two or more PCB's.

The rigid PCB's may for example have parallel longitudinal sides connected by the flexible board. One of the short sides of the stacked rigid PCB's can be used for connection to optical waveguides of an associated optical cable. Alternatively, the flex board may connect short sides of the two rigid PCB's or it may connect a small side of one rigid PCB to a longitudinal side of the other rigid PCB.

In a specific embodiment the opto-electrical transceiver module may comprise a microcontroller, for instance on the second rigid PCB.

To enable efficient heat management the transceiver module may for example comprise a housing with a thermoconductive bridge, typically at an inner surface of the housing, contacting the first PCB at or near the driver circuitry and/or the amplifier circuitry. This allows effective heat dissipation of heat generated by the driver and amplifier circuitries. To monitor these heat flows via the housing, the transceiver module may comprise a housing with a thermoconductive bridge, typically at an inner surface of the housing, in thermoconductive contact with the microcontroller, which typically comprises an internal thermal sensor.

Optionally, the flexible board and the two PCB's can be made as a single part e.g., in a rigid-flex-rigid structure. Rigid-flex circuits are a hybrid construction of rigid and flexible substrates which are laminated together into a single structure. Alternatively, the rigid board can be connected by means of a board to board connector.

The opto-electronic transceiver module can for example have an open optical port connection, which can be used to connect an optical cable by plugging the terminal end of the optical cable into the open port. Alternatively, the module can be connected to an optical cable by means of a permanent connection, e.g., by means of a cable boot with a cable insert piece.

An active optical cable is disclosed comprising at least one, e.g., two terminal ends provided with an opto-electrical transceiver module according to the disclosure above.

The present disclosure will be further explained with reference to the accompanying drawings showing an exemplary embodiment of the disclosed opto-electrical transceiver module and of the disclosed active optical cable.

BRIEF DESCRIPTION OF THE DRAWINGS

FIG. 3 is a sectional end elevation view of the transceiver module illustrated in FIG. 1, taken through a flexible board of the transceiver module; and FIG. 4 is a top plan view of circuit boards of the transceiver module illustrated in FIG. 1, shown unfolded.

DETAILED DESCRIPTION

Figure 1:
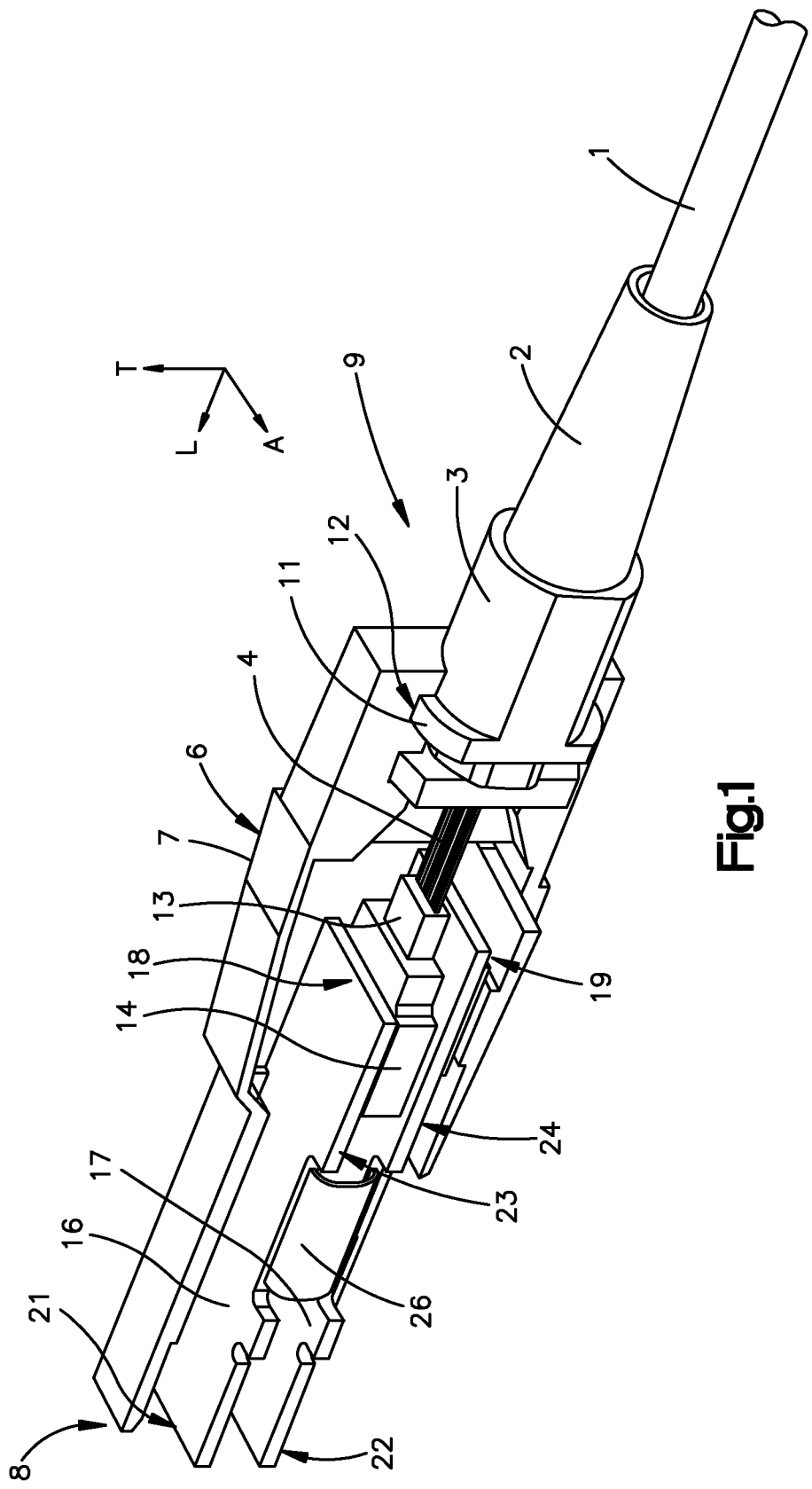
FIG. 1 is a perspective view of an opto-electrical transceiver module constructed in accordance with one embodiment, shown with a housing of the opto-electrical transceiver module partly broken away.

FIG. 1 shows a terminal end of an optical cable 1 with a cable boot 2 comprising a cable insert 3. The optical cable 1 holds a plurality of optical fibers 4 with terminal ends protruding from the insert piece 3 along a longitudinal direction L. The cable insert 3 connects the cable 1 to an opto-electrical transceiver module 6 with a housing 7 having a connector opening 8 at one end and a cable entry 9 at the opposite end. The connector opening 8 and the cable entry 9 can be spaced from each other along the longitudinal direction L. The insert piece 3 can have a flanged end 11 profiled to provide a tight mechanical coupling with a correspondingly profiled inner surface 12 of the cable entry 9.

The optical fibers 4 are aligned and clamped in a ferrule 13 presenting the outer ends of these optical fibers 4 to an optical coupling unit 14 with an array of lenses (not shown), each lens being arranged in optical communication with an outer end of an associated optical fiber 4 held in the ferrule 13.

The opto-electrical transceiver module 6 further comprises two rigid printed circuit boards (PCB's), including a transmitter PCB 16 and a receiver PCB 17. The two rigid PCB's 16 and 17 are arranged in a parallel relationship, the transmitter PCB 16 being positioned above the receiver PCB 17 along a transverse direction T that is perpendicular to the longitudinal direction L. The transmitter PCB 16 carries high speed light sources 42 (see FIG. 4) for converting incoming electrical signals into outgoing optical signals, and optical receiver components 41 (see FIG. 4) for converting incoming optical signals into outgoing optical signals. The high speed light sources 42 can for example be vertical cavity surface emitting lasers (VCSEL's). The optical receiver components 41 can for example be PIN diodes.

The optical coupling unit 14 is carried by the transmitter PCB 16 in a position between the two PCB's 16 and 17. The two PCB's 16 and 17 are rigid boards with a rectangular outline. The transmitter PCB 16 has a short side 18 facing the cable entry 9 and a short side 21 at the connector opening 8. The short sides 18 and 21 can be spaced from each other along the longitudinal direction L. The receiver PCB 17 also has a short side 19 facing the cable entry 9 and a short side 22 at the connector opening 8. The short sides 19 and 22 are spaced from each other along the longitudinal direction L. The transmitter PCB 16 has a longitudinal side 23, and the receiver PCB has a longitudinal side 24. The longitudinal side 23 of the transmitter PCB 16 is connected to the oppositely arranged longitudinal side 24 of the receiver PCB 17 by a flexible board 26. The ferrule 13 and the optical coupling unit 14 are positioned between the PCB's 16 and 17 at the end facing the cable entry 9. The opposite short sides 21 and 22 of the rigid PCB's 16 and 17, respectively, are contact edges with contact fingers accessible via the connector opening 8 and arranged to be contacted by complementary contacts of a host device (not shown).

The optical coupling unit 14 receives optical signals from the fibers 4 held in the ferrule 13 and guides these optical signals to the optical receiver components 41 with associated downstream amplifier circuitry 47 (see FIG. 4). These electrical signals are then transferred via the flexible board 26 to the receiver PCB 17 and subsequently to receiving conductors of the host device.

Electrical signals coming from the host device travel from electrical input signal contacts 46 (see FIG. 4) on the transmitter PCB 16 via electrical driver circuitry 43 (see FIG. 4) to the light sources 42, which convert electrical signals into optical signals. These optical signals are subsequently passed via the optical coupling unit 14 to the optical fibers 4 of the optical cable 1.

The optical cable 1 with the opto-electrical module 6 at one end and a similar opto-electrical module 6 at its other end forms an active optical cable compatible with electrical inputs as used with a traditional copper cable, but using optical fibers between the connectors.

In an alternative embodiment the cable entry 9 of the opto-electronic transceiver module 6 can be provided with an open optical port, allowing a user to plug in an optical cable.

Figure 2:
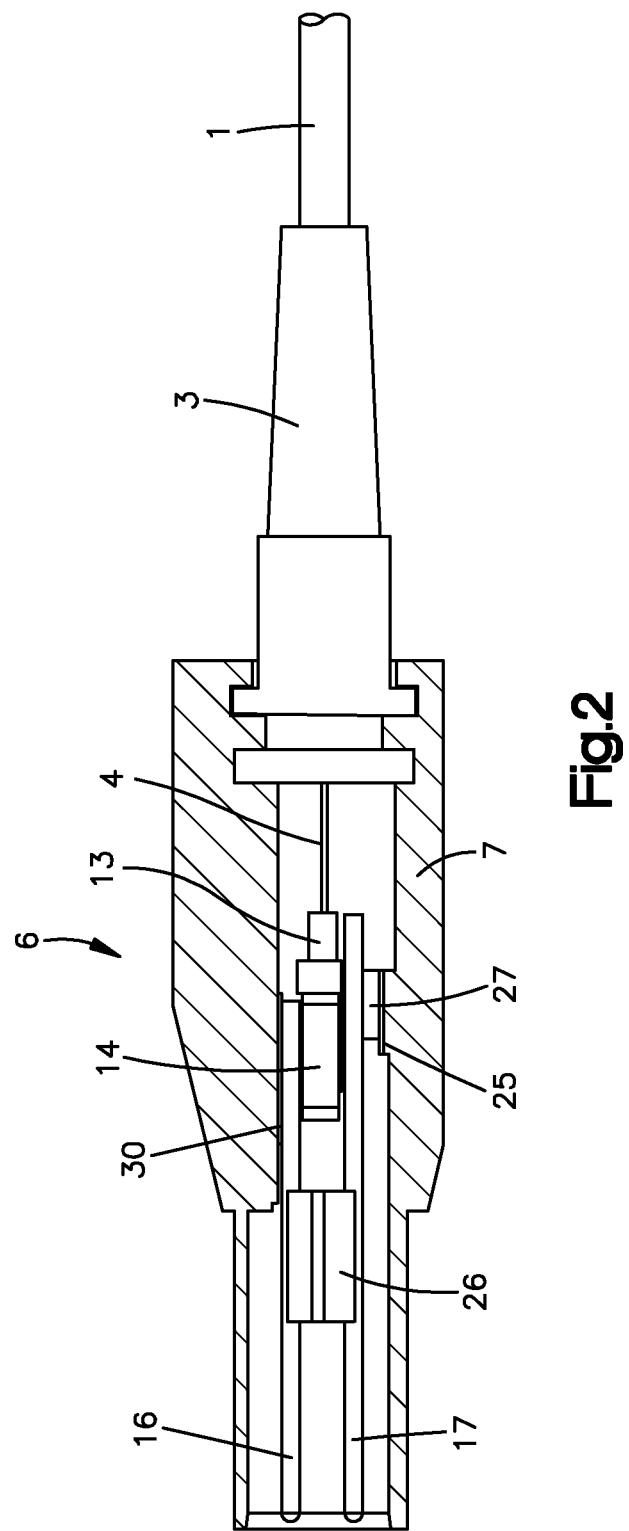
FIG. 2 is a sectional side elevation view of the transceiver module illustrated in FIG. 1.

The opto-electrical module 6 is shown in longitudinal cross section in FIG. 2. A microcontroller 27 is located between the housing 7 and the receiver PCB 17. The microcontroller 27 controls and monitors the driver circuitry 43 as well as the amplifying circuitry 47 on the transmitter PCB 16. Low speed electrical signals to and from the microcontroller 27 are supplied to and received from the amplifier and driver circuitries 43 and 47, respectively, via the flexible board 26 and also to the electrical connector sides 46 and 49, respectively, to provide low speed data transmission to or from a connected host device.

The inner surface of the housing is provided with a thermoconductive bridge 25 contacting the microcontroller 27. Since the microcontroller 27 comprises an internal thermal sensor, the temperature of the housing can be monitored. Similarly, a thermoconductive bridge 30 is provided between the inner surface of the housing 7 and the transmitter PCB 16 at the position of the optical coupling unit 14 and the driver and amplifier circuitries 43 and 47, respectively. This facilitates heat dissipation from the driver and amplifier circuitries 43 and 47, respectively, via the housing 7.

FIG. 3 shows a cross section of the opto-electrical transceiver module 6 along a plane perpendicular to the longitudinal direction crossing the flexible board 26. The plane can extend along the transverse direction T and a lateral direction A that is perpendicular to both the longitudinal direction L and the transverse direction T. The housing 7 can be formed of two portions 33 and 34. The portions 33 and 34 can define substantially mirrored halves 33 and 34, or the housing 7 can be alternatively constructed as desired. Edges of the transmitter PCB 16 and the receiver PCB 17 at their respective longitudinal sides 28 and 29 are slid into matching recesses 31 and 32, respectively, in the inner side of one of the halves 34 of the housing 7. In other cross sectional planes (not shown) the opposite longitudinal edges of the transmitter PCB 16 and the receiver PCB 17 are similarly received in corresponding recesses in the inner surface of the other one of the halves 33 of the housing 7.

The flexible board 26 and the rigid transmitter PCB 16 and the receiver PCB 17 can be integrally manufactured as a single rigid-flex-rigid substrate. Such a substrate can be folded and unfolded. Such a substrate is shown unfolded in FIG. 4. The optical coupling unit 14 is substantially U-shaped having an open side that is configured to receiving the ferrule 13. The inner side of the U-shape provides first and second guiding surfaces 37 and 38, respectively, and alignment pins 39 to enable accurate positioning of the ferrule with the optical fiber ends 4.

Lenses of the optical coupling unit 14 communicate with individual fiber ends 4 and guide optical signals from the optical fiber ends 4 to an array of PIN diodes 41 or in the opposite direction from an array of VCSEL's 42 to respective optical fiber ends. Although the arrays of PIN diodes 41 and VCSEL's 42 are covered by the optical coupling unit 14, they are indicated in FIG. 4 for the purposes of illustration.

The VCSEL's 42 are connected to driver circuitry 43, which is connected via conductive paths 44 to contact fingers 46 at the short side of the transmitter PCB 16. Electrical signals from a host device travel via the contact fingers 46 to the driver circuitry 43 driving the VCSEL's 42 to convert the electrical signals to optical signals which are guided by the optical coupling unit 14 to enter the optical fibers 4 of the cable 1.

The PIN diodes 41 convert incoming optical signals to electrical signals which are transferred to the receiver chip 47 configured to amplify signals to a suitable logical output signal level. The amplified signals are transferred via conductive paths 48 on the receiver PCB 17 to contact fingers 49 at the short side 22 of the receiver PCB 17.

The array of PIN diodes 41 is in line with the array of VCSEL's 42. The optical coupling unit 14 forms a single interface between the optical waveguides of a cable one the one hand and the VCSEL's and PIN diodes on the other hand.

The foregoing description is provided for the purpose of explanation and is not to be construed as limiting the invention. While various embodiments have been described with reference to preferred embodiments or preferred methods, it is understood that the words which have been used herein are words of description and illustration, rather than words of limitation. Furthermore, although the embodiments have been described herein with reference to particular structure, methods, and embodiments, the invention is not intended to be limited to the particulars disclosed herein. For instance, it should be appreciated that structure and methods described in association with one embodiment are equally applicable to all other embodiments described herein unless otherwise indicated. Those skilled in the relevant art, having the benefit of the teachings of this specification, may effect numerous modifications to the invention as described herein, and changes may be made without departing from the spirit and scope of the invention, for instance as set forth by the appended claims.

The invention claimed is:

1. An opto-electrical transceiver module comprising:
   a first rigid printed circuit board having:
      at least one light source with driver circuitry configured to convert incoming electrical signals to optical signals;
      at least one optical receiver component with amplifier circuitry configured to convert optical signals to electrical signals;
      a single optical coupling unit configured to optically couple waveguides of an optical cable to the at least one light source as well as to the at least one optical receiver component; and
      a plurality of first electrical contact pads disposed along an edge of the first rigid printed circuit board, the first electrical contact pads being configured to connect to a host device; and
   a second rigid printed circuit board having a plurality of second electrical contact pads disposed along an edge of the second rigid printed circuit board, the second electrical contact pads being configured to connect to the host device,
   wherein a conductive path extends from at least one second electrical contact pad on the second rigid printed circuit board to and terminates on the first rigid printed circuit board at one of the driver circuitry and the amplifier circuitry on the first rigid printed circuit board.

2. The opto-electrical transceiver module according to claim 1, further comprising a flexible board that connects the at least one electrical contact of the second rigid printed circuit board with the driver circuitry or amplifier circuitry.

3. The opto-electrical transceiver module according to claim 2, wherein the flexible board is folded to align the first and second rigid printed circuit boards, wherein each of the first and second rigid printed circuit boards has a respective contact edge, the contact edges parallel to each other so as to contact corresponding connections of the host device.

4. The opto-electrical transceiver module according to claim 1, wherein the optical coupling unit is disposed between the first and second rigid printed circuit boards.

5. The opto-electrical transceiver module according to claim 1, wherein one of the first and second rigid printed circuit boards carries a microcontroller.

6. The opto-electrical transceiver module according to claim 5, wherein the microcontroller is carried on the second rigid printed circuit board at a surface opposite to a surface of the second printed board that faces the first rigid printed circuit board.

7. The opto-electrical transceiver module according to claim 5, further comprising a housing having a thermoconductive bridge that contacts the microcontroller.

8. The opto-electrical transceiver module according to claim 1, further comprising a housing having a thermoconductive bridge that contacts the first rigid printed circuit board at a location at least proximate to one or both of the driver circuitry and the amplifier circuitry.

9. The opto-electrical transceiver module according to claim 8, wherein the location is at one or both of the driver circuitry and the amplifier circuitry.

10. The opto-electrical transceiver module according to claim 1, comprising an open optical port connection.

11. The opto-electrical transceiver module according to claim 1, wherein a board-to-board connector connects the at least one second electrical contact pad of the second rigid printed circuit board with the driver circuitry or the amplifier circuitry.

12. The opto-electrical transceiver module according to claim 1, wherein the driver circuitry and the amplifier circuitry are connected to respective electrical contact pads on each of the first and second rigid printed circuit boards.

13. An active optical cable having a terminal end provided with an opto-electrical transceiver module, the opto-electrical transceiver module comprising:
  a first rigid printed circuit board carrying having:
    at least one light source with driver circuitry configured to convert incoming electrical signals to optical signals;
    at least one optical receiver component with amplifier circuitry configured to convert optical signals to electrical signals; and
    a single optical coupling unit configured to optically couple waveguides of an optical cable to the at least one light source as well as to the at least one optical receiver component; and
    a plurality of first electrical contact pads disposed along an edge of the first rigid printed circuit board, the first electrical contact pads being configured to connect to a host device; and
  a second rigid printed circuit board having a plurality of second electrical contact pads disposed along an edge of the second rigid printed circuit board, the second electrical contact pads being configured to connect to the host device,
  wherein a conductive path extends from at least one second electrical contact pad on the second rigid printed circuit board and terminates on the first rigid printed circuit board at one of the driver circuitry and the amplifier circuitry on the first rigid printed circuit board.

14. The active optical cable according to claim 13, further comprising a flexible board that connects the at least one electrical contact of the second rigid printed circuit board with the driver circuitry or amplifier circuitry.

15. The active optical cable according to claim 14, wherein the flexible board is folded to align the first and second rigid printed circuit boards, wherein each of the first and second rigid printed circuit boards has a respective contact edge, the contact edges parallel to each other so as to contact corresponding connections of the host device.

16. The active optical cable according to claim 13, wherein the optical coupling unit is disposed between the first and second rigid printed circuit boards.

17. The active optical cable according to claim 13, wherein one of the first and second rigid printed circuit boards carries a microcontroller.

18. The active optical cable according to claim 17, wherein the microcontroller is carried on the second rigid printed circuit board at a surface opposite to a surface of the second printed board that faces the first rigid printed circuit board.

19. The active optical cable according to claim 17, further comprising a housing having a thermoconductive bridge that contacts the microcontroller.

20. The active optical cable according to claim 13, further comprising a housing having a thermoconductive bridge that contacts the first rigid printed circuit board at a location at least proximate to one or both of the driver circuitry and the amplifier circuitry.

21. The active optical cable according to claim 20, wherein the location is at one or both of the driver circuitry and the amplifier circuitry.

22. The active optical cable according to claim 13, comprising an open optical port connection.

23. The active optical cable according to claim 13, wherein a board-to-board connector connects the second at least one electrical contact of the second rigid printed circuit board with the driver circuitry or the amplifier circuitry.

24. The active optical cable according to claim 13, wherein the driver circuitry and the amplifier circuitry are connected to respective electrical contact pads on each of the first and second rigid printed circuit boards.

25. The opto-electrical transceiver module according to claim 4, wherein the first rigid printed circuit board defines a first surface, the second rigid printed circuit board defines a second surface that faces the first surface, and the optical coupling unit is disposed between the first and second rigid printed circuit boards such that the first and second surfaces face the optical coupling unit.

26. The active optical cable according to claim 1, wherein a second conductive path extends from the at least one first electrical contact pad on the first rigid printed circuit board and terminates on the first rigid printed circuit board at another one of the driver circuitry and the amplifier circuitry on the first rigid printed circuit board.

* * * * *